Dec. 25, 1928.
T. P. ROTH
1,696,503
TUBE AND TIRE SAVER
Filed April 6, 1926
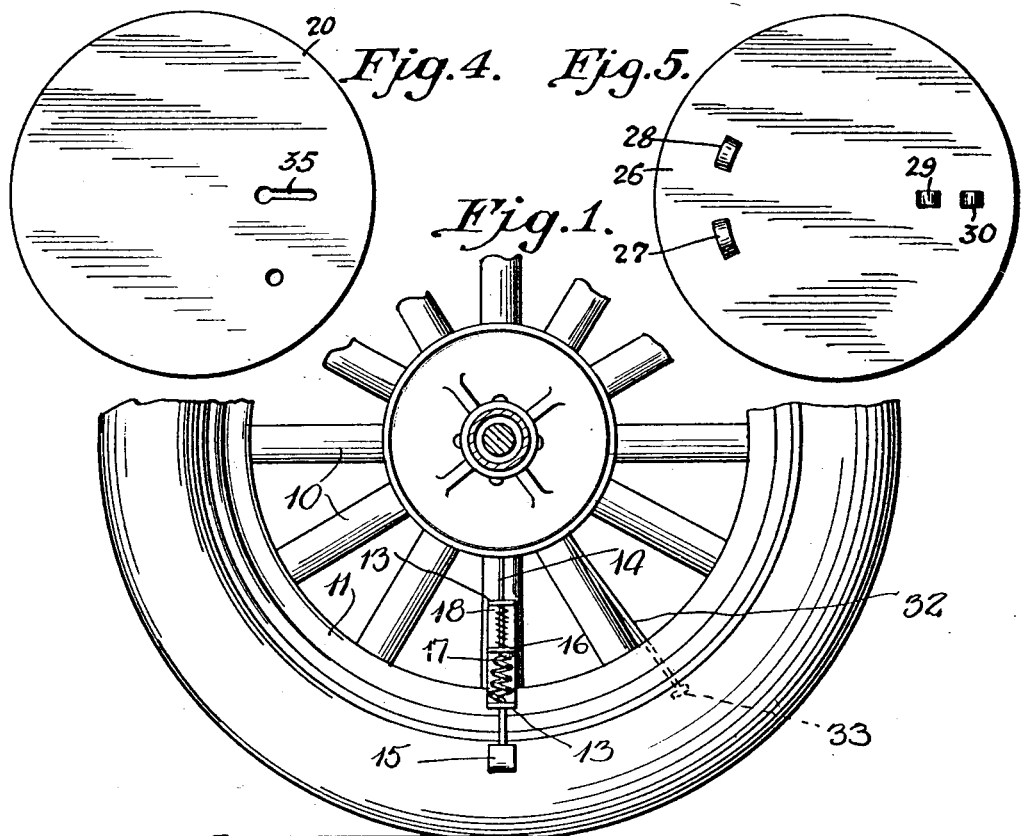
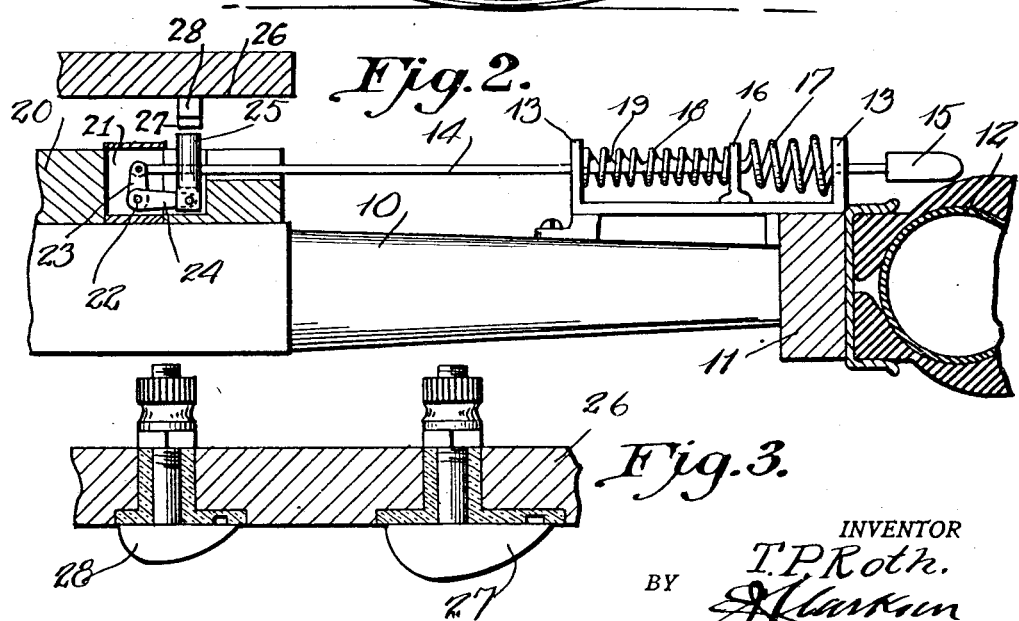
INVENTOR
T. P. Roth.
BY
ATTORNEY Patented Dec. 25, 1928.

1,696,503

UNITED STATES PATENT OFFICE.

THOMAS P. ROTH, OF LOUISVILLE, KENTUCKY.

TUBE AND TIRE SAVER.

Application filed April 6, 1926. Serial No. 100,135.

This invention relates to signals and has special reference to a tire deflation signal adapted to indicate whenever a vehicle tire becomes deflated.

I am aware that signals have been devised for this purpose but one of the objects of the present invention is to so improve the construction of such signals that a plurality of primary signals will be given whenever the air pressure in a pneumatic tire drops below the minimum advisable pressure and a secondary signal will be given whenever the pressure becomes so low that there is danger of producing rim cuts in the tire.

A second important object of the invention is to provide an improved construction for the circuit closing mechanism of an electric tire deflation signal.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a view from the inner side of a vehicle wheel showing the circuit closing means applied thereto.

Figure 2 is an enlarged detail radial section through a portion of such wheel showing one of the circuit closing means in elevation.

Figure 3 is a detail section on the line 3—3 of Figure 1 showing certain fixed contacts used herewith.

Figure 4 is a detail view of the inside of one portion of the brake drum of such a wheel.

Figure 5 shows the confronting face of the other portion of such brake drum.

This device may be applied to any vehicle wheel such as is shown at 10, the wheel here being illustrated as a spoked wheel although the device can as readily be used with a disk wheel. This wheel carries the usual rim 11 and pneumatic tire 12. Extending radially inward from the rim is a bracket having its ends turned up to form spaced guides 13 wherethrough passes a rod 14 having one end provided with a head 15 which lies close to the wheel rim and projects beyond the rim to such extent that when the tire is deflated to a dangerous extent this head will come in contact with the ground as the wheel rotates. Between the guides 13 the rod 14 is provided with a guide collar 16 and between this collar and the outer guide 13 the rod is coiled to form a spring 17 so that the rod is longitudinally yieldable and injury to the contacts and other parts is prevented. Between the inner guide and the collar 16 is a spring 18 which surrounds the rod and urges the same outwardly. This portion of the rod is also notched to provide ratchet teeth 19 so that when the rod is forced inwardly it will be prevented from outward movement until manually released. At 20 is a plate which is fixed to the wheel and is preferably the revolving brake drum of the wheel. On this plate 20 is mounted a bracket 21 which supports a rock shaft 22 having an arm 23 connected to the inner end of the rod 14. The rock shaft also has a second arm 24 angularly displaced around the rock shaft with respect to the first arm and this second arm is connected to a plunger 25 forming a movable contact. A second plate 26 is fixed in spaced relation to the plate 20 and this second plate is preferably the brake drum cover. Suitably insulated from the second plate is a pair of fixed contacts 27 and 28 which are so positioned that revolution of the wheel causes the plunger to move past these contacts in succession. In normal forward movement of the vehicle it will be seen that the first of these contacts is arranged to project further toward the movable contact than the second so that slight inward movement of the head 15 only causes engagement between the plunger and the higher fixed contact while further movement of such head causes the movable contact to engage first on the higher fixed contact and then to engage on the lower, the coiled part 17 permitting the rod to yield so that the movable contact may pass the fixed contact 27 without injury.

The operation of the device is as follows: Whenever the deflation becomes such that the ground or the tire engages the head 15 and pushes the latter somewhat inwardly the contact 25 will be moved so that as the wheel revolves a white light will be lit on the dash board of the vehicle through circuits of any desired type and not deemed necessary to be described. This indicates a serious condition but one which, nevertheless, will still permit the operator to drive the vehicle if care is used for a short distance. Further deflation, however, results in a red light being displayed and an alarm sounded which indicates that the tire is flat and is in need of immediate attention.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a tire deflation signal, circuit closing means including a wheel having a pneumatic tire thereon, guides on said wheel alined radially with respect to the axis of the wheel, a rod extending through said guides and having ratchet teeth thereon facing toward the outer end of the rod and engageable with one of said guides upon the rod being moved inwardly, spring means normally holding said rod in outwardly protruded position, a plurality of fixed contacts adjacent one side of the wheel and projecting toward the wheel to terminate at graduated distances from the wheel, a movable contact carried by the wheel and projecting from one side thereof to move toward and from the side of the wheel and out of position to engage the fixed contacts independently and successively, and operative means connecting the rod and movable contact.

2. In a tire deflation signal, circuit closing means including a wheel having a pneumatic tire thereon, guides on said wheel alined radially with respect to the axis of the wheel, a rod extending through said guides and having ratchet teeth thereon facing toward the outer end of the rod and engageable with one of said guides upon the rod being moved inwardly, spring means normally holding said rod in outwardly protruded position, a plurality of fixed contacts adjacent one side of the wheel and projecting toward the wheel to terminate at graduated distances from the wheel, a movable contact carried by the wheel and projecting from one side thereof to move toward and from the side of the wheel and into and out of position to engage the fixed contacts independently and successively, a rock shaft carried by the wheel and extending transversely of the inner end of said rod, an arm extending from the rock shaft and connected to said rod, and a second arm extending from the rock shaft displaced angularly around the shaft with respect to the first arm and connected to the movable contact.

In testimony whereof I affix my signature.

THOMAS P. ROTH.